US009819987B2

United States Patent
Reddy et al.

(10) Patent No.: US 9,819,987 B2
(45) Date of Patent: Nov. 14, 2017

(54) CONTENT ENTITLEMENT DETERMINATIONS FOR PLAYBACK OF VIDEO STREAMS ON PORTABLE DEVICES

(75) Inventors: Sachinder Reddy, Allen, TX (US); Enrique Ruiz-Velasco, Flower Mound, TX (US); Venkata Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 589 days.

(21) Appl. No.: 12/948,476

(22) Filed: Nov. 17, 2010

(65) Prior Publication Data
US 2012/0124613 A1 May 17, 2012

(51) Int. Cl.
H04N 21/414 (2011.01)
H04N 21/258 (2011.01)
H04N 21/422 (2011.01)
H04N 21/6334 (2011.01)

(52) U.S. Cl.
CPC . *H04N 21/41407* (2013.01); *H04N 21/25883* (2013.01); *H04N 21/42202* (2013.01); *H04N 21/6334* (2013.01)

(58) Field of Classification Search
CPC ....... H04N 21/41407; H04N 21/25841; H04N 21/2541; H04N 21/44213; H04N 21/4524; H04N 21/454; H04N 21/63345; H04N 21/8355; H04N 7/17318; H04N 21/25883; H04N 21/4627; H04N 21/6131; H04N 21/6334; H04N 21/42202; H04N 21/835; H04L 12/189; H04L 67/16; H04L 67/18; H04L 67/20; H04L 67/30; H04L 12/2898; H04L 63/083; G06F 2221/2111; G06Q 20/206

USPC ....... 718/103; 455/432.1; 707/823; 709/205, 709/217, 223, 229; 725/87, 93, 109, 118, 725/31, 80, 810, 25, 27; 713/155, 193, 713/176; 380/217; 710/8
See application file for complete search history.

(56) References Cited

U.S. PATENT DOCUMENTS 4,771,458 A * 9/1988 Citta et al. .................... 380/239
7,114,170 B2 * 9/2006 Harris et al. .................... 725/34
(Continued)

OTHER PUBLICATIONS

IBM, Mobile Content Delivery Server with Push and Context Awareness, May 4, 2007, IP.com, IPCOM000152465D, p. 1.*
(Continued)

*Primary Examiner* — Benjamin R Bruckart
*Assistant Examiner* — Jen-Shi Huang

(57) ABSTRACT

Video content is streamed to portable devices based on an entitlement determination that includes determining the location of the portable device. Channel listings available for the portable device may be filtered based on the determined entitlements. A device may determine an indication of a location of the portable device and determine entitlements defining which of the plurality of video content items are permitted to be viewed by the portable device, where the entitlements are determined based at least on the indication of the location of the portable device. The device may further transmit, to the portable device, a listing of the plurality of video content items, filtered based on those of the plurality of video content items that are permitted to be viewed by the portable device, as determined by the entitlements.

22 Claims, 9 Drawing Sheets

(56) References Cited

U.S. PATENT DOCUMENTS

| | | | |
|---|---|---|---|
| 7,644,265 B2* | 1/2010 | Kudo | H04L 63/061 |
| | | | 713/150 |
| 7,769,641 B2* | 8/2010 | Jouret et al. | 705/26.1 |
| 8,024,186 B1* | 9/2011 | De Bonet | 704/238 |
| 8,135,618 B1* | 3/2012 | Friedlander | 705/14.46 |
| 8,266,647 B2* | 9/2012 | Howcroft | H04N 7/16 |
| | | | 725/25 |
| 8,589,970 B2* | 11/2013 | Teraoka | H04L 63/0428 |
| | | | 725/31 |
| 9,160,970 B2* | 10/2015 | Howcroft | H04N 7/16 |
| 9,258,587 B2* | 2/2016 | Reddy | H04N 21/25841 |
| 2003/0233580 A1* | 12/2003 | Keeler et al. | 713/201 |
| 2004/0078575 A1* | 4/2004 | Morten et al. | 713/176 |
| 2006/0291660 A1* | 12/2006 | Gehrmann | H04L 63/045 |
| | | | 380/277 |
| 2007/0217612 A1* | 9/2007 | So | 380/277 |
| 2007/0226765 A1* | 9/2007 | Bahnck | H04H 20/103 |
| | | | 725/63 |
| 2008/0022003 A1* | 1/2008 | Alve | G01S 5/0009 |
| | | | 709/229 |
| 2008/0081640 A1* | 4/2008 | Tran et al. | 455/456.3 |
| 2008/0097919 A1* | 4/2008 | Szucs | 705/52 |
| 2008/0163304 A1* | 7/2008 | Ellis | H04N 5/44543 |
| | | | 725/50 |
| 2008/0168487 A1* | 7/2008 | Chow | H04N 7/165 |
| | | | 725/31 |
| 2008/0235731 A1* | 9/2008 | Bryant et al. | 725/44 |
| 2008/0288338 A1* | 11/2008 | Wiseman et al. | 705/14 |
| 2008/0305738 A1* | 12/2008 | Khedouri et al. | 455/3.06 |
| 2009/0157897 A1* | 6/2009 | Echigo et al. | 709/232 |
| 2009/0254980 A1* | 10/2009 | Kanaparti | H04L 12/2818 |
| | | | 726/4 |
| 2009/0265775 A1* | 10/2009 | Wisely | H04L 63/0492 |
| | | | 726/9 |
| 2009/0327091 A1* | 12/2009 | Hartin | G06F 21/121 |
| | | | 705/26.1 |
| 2010/0131675 A1* | 5/2010 | Pan | 709/247 |
| 2011/0004893 A1* | 1/2011 | Borislow | H04N 7/165 |
| | | | 725/25 |
| 2011/0041149 A1* | 2/2011 | Piepenbrink | H04H 60/15 |
| | | | 725/28 |
| 2012/0174150 A1* | 7/2012 | Reddy | H04N 21/25841 |
| | | | 725/31 |

OTHER PUBLICATIONS

Co-pending U.S. Appl. No. 12/948,431, filed Nov. 17, 2010, entitled "Video Streaming Entitlement Determined Based on the Location of the Viewer", by Venkata Adimatyam et al., 37 pages.

* cited by examiner

CONTENT ENTITLEMENT DETERMINATIONS FOR PLAYBACK OF VIDEO STREAMS ON PORTABLE DEVICES

BACKGROUND

Video content (e.g., television broadcasts, pay-per-view (PPV) content, video-on-demand (VOD) content, etc.) may be delivered and selected in several ways. For example, television channels may be broadcast to users. Traditionally, television broadcasts have been viewed on televisions sets. More recently, users have been offered the ability to view television broadcasts on other devices, such as desktop computers, portable computers, and portable communication devices.

Content owners may wish to place limits on how a user is allowed to view video content. For example, certain content may only be available to subscribers of a certain "premium" channel or other service. As another example, some subscribers may be given immediate access to certain content while other subscribers, such as those subscribing to a more basic level of service, may be required to wait a certain time period before being able to view the content. It is thus desirable for a content provider to be able to effectively determine and enforce whether a subscriber is entitled to view content based on a wide variety of possible entitlement factors.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allow customers that are subscribed to a television service to view certain channels on devices, such as portable communication devices, other than the customers' televisions. The set of available content (e.g., the current channel lineup) may be determined based on factors that include the customer's current geographic location and the customer's subscribed channels.

In one example implementation, a subscriber to video content may wish to view video content on a portable device, such as a laptop or tablet computing device. Entitlements to available video content may be determined based on a number of factors, including the location of the portable device. A listing of the available video content, filtered based on the video content to which the portable device is entitled, may be presented to the subscriber.

Figure 1:
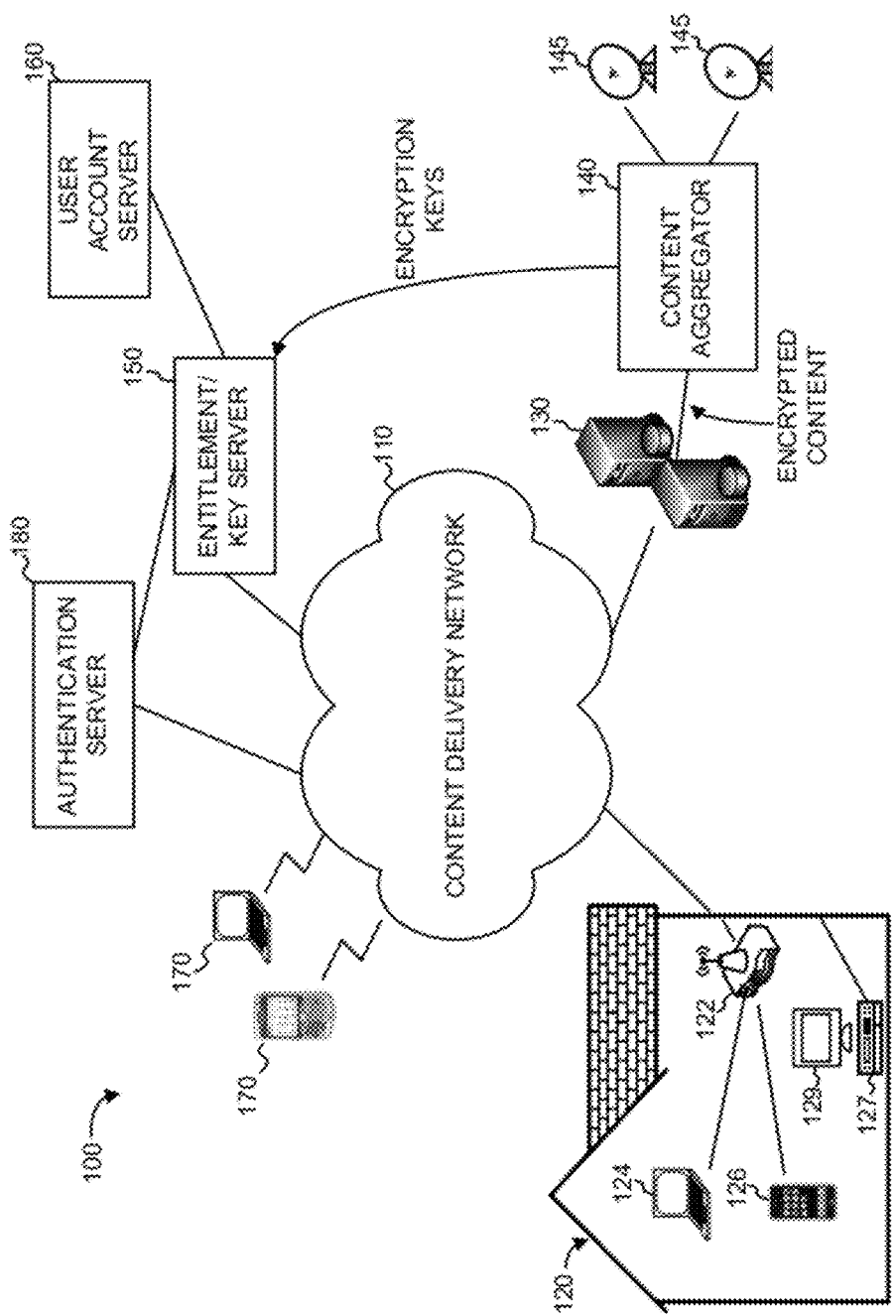
FIG. 1 is a diagram of an example environment in which systems and/or methods described herein may be implemented.

FIG. 1 is a diagram of an example environment 100 in which systems and/or methods described herein may be implemented. As illustrated, environment 100 may include a content delivery network 110, customer premises 120, content servers 130, content aggregator 140, entitlement and/or key server 150, user account server 160, computing devices 170, and authentication server 180. Content aggregator 140 may be coupled to one or more devices, such as satellites 145, through which content (e.g., television content) is received. Customer premises 120 may include one or more devices that can connect to content delivery network 110, such as wireless router 122, laptop computer 124, portable device 126, set-top box (STB) 127, and/or television 129. Other computing devices 170, such as laptop computers and portable communication devices, may also connect to content delivery network 110.

Content delivery network 110 may generally include a local area network (LAN), a wide area network (WAN), a metropolitan area network (MAN), a wireless network, an optical fiber (or fiber optic)-based network, a cable television network, a satellite television network, or a combination of networks. Content delivery network 110 may particularly include an IP-based network. In some implementations, content delivery network 110 may be a private network controlled by, for example, a telecommunications company that provides television, telephone, and/or data access to customer premises 120. In another implementation, content delivery network 110 may be a public network, such as the Internet, or a combination of a public and private network.

Customer premises 120 may include a residential or business entity that is connected to content delivery network 110 by a telecommunication company. Customer premises 120 may be connected to content delivery network 110 using, for example, a fiber optic connection, a coaxial connection, a satellite connection, or another type of wireless or wired connection. A gateway device may be used to connect customer premises 120 to content delivery network 110. For example, for a fiber optic connection, an optical network terminal (ONT) may convert the optical signals into an electrical format that can be used by wireless router 122. Alternatively, the functionality of the ONT may be incorporated into wireless router 122. Devices in customer premises 120 may include, for example, STBs (e.g., STB 127), televisions (e.g., television 129), computers (e.g., laptop computer 124), portable devices (e.g., portable device 126), and home networking equipment (e.g., routers, cables, splitters, local gateways, etc.). Devices within customer premises 120 may be connected via wired connections (e.g., coaxial cable, Telecommunications Industry Association category 5 ("cat 5") cable, etc.) and/or wireless connections (e.g., using network devices such as those available under the IEEE 802.11 wireless LAN standards). In the example shown in FIG. 1, customer premises 120 includes wireless router 122, which connects laptop computer 124 and portable device 126 to content delivery network 110. Additionally, STB 127 is shown as connecting to a television 129. STB 127 may be used to control the content shown on television 129.

Content servers 130 may include one or more server devices that store content, such as video content, that may be delivered to customer premises 120 and/or other computing devices 170. The content may include, for example, television broadcasts, video-on-demand programming, or other video content. Content servers 130 may deliver the stored content as on-demand streaming content. The television programming may be stored and made available, by content servers 130, in real-time or near real-time relative to the original broadcast of the television programming. In addition to storing video content, content servers 130 may store other information, such as index information that provides links to keys needed to decrypt the content and listing information that provides a description of the content that is available to the customer.

Content aggregator 140 may aggregate content, such as television programming, from a number of sources. Content aggregator 140 may, for example, receive signals for national television channels via satellites 145. Content aggregator 140 may also receive and store local television programming. In one implementation, content aggregator 140 may be distributed over a number of geographical regions. For example, content aggregator 140 may be present at each of a number of local markets, where the content aggregator associated with each local market may receive and store local programming for that market. In this situation, national television programming may be captured at a central facility and transmitted to each of the local content aggregators. Content aggregator 140 may additionally encrypt its received content. In one implementation, content aggregator 140 may encrypt incoming video streams, using, for example, a symmetric encryption technique such as AES (Advanced Encryption Standard). The encrypted video streams may be encrypted as discrete sections in which the encryption is changed for each section. Content aggregator 140 may transmit the encryption keys to entitlement/key server 150.

Entitlement/key server 150 may include one or more server devices that provide authentication and eligibility determinations for users that wish to view content stored at content servers 130. Entitlement/key server 150 may, for example, operate to authenticate the user and provide session decryption keys through which the user may decrypt content from content servers 130. In one implementation, user authentication may be provided with the assistance of a third party, such as a third party certificate authority, illustrated as authentication server 180.

User account server 160 may include one or more server devices that include account information for a customer. The account information may include information relating to programming (e.g., television channels), packages, or services to which a user has subscribed. User account server 160 may include other information relating to the users, such as the equipment installed at the customer premise. For example, a telecommunications company may provide each of customer premises 120 with a router, such as wireless router 122. Identification information for wireless router 120, such as a media access control (MAC) address associated with the router, or the IP address assigned to the router, may be stored by user account server 160. Entitlement/key server 150 may contact user account server 160 when performing entitlement checks and/or key delivery.

Computing devices 170 may include other computing devices, such as laptop computers and/or portable communication devices, that may connect to content delivery network 110. Portable devices from within customer premises 120, when taken outside of customer premises 120, may be referred to as computing devices 170.

Authentication server 180 may provide authentication services for users that wish to receive video streams from content servers 130. Authentication server 180 may, for example, receive and process HTTPS (hyper text protocol secure) requests from users. Authentication server 180 may communicate the results of an authentication to entitlement/key server 150. In some implementations, authentication may be performed by entitlement/key server 150 and the functionality of authorization server 180 may be incorporated into entitlement/key server 150.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
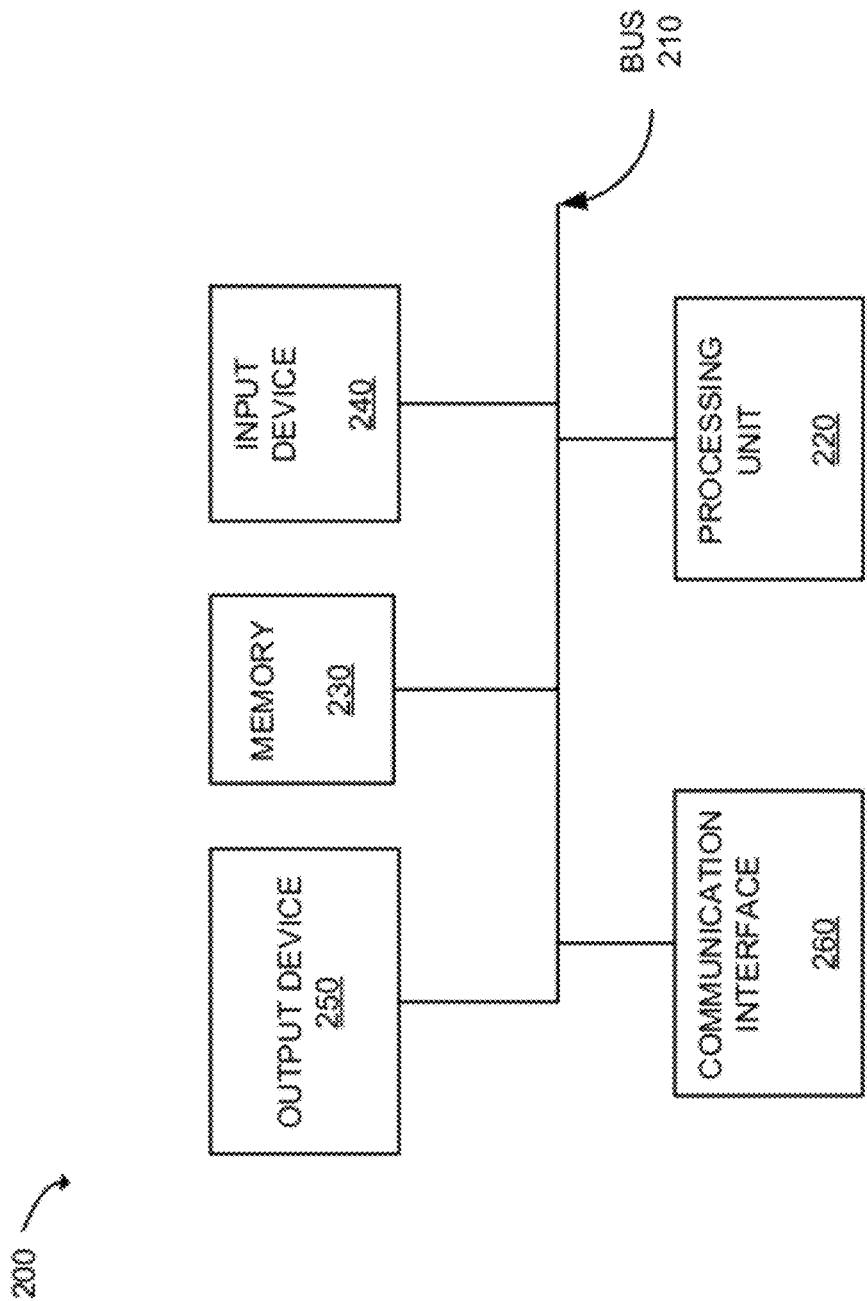
FIG. 2 is a diagram of example components of a device that may correspond to one of the devices of the environment shown in FIG. 1.

FIG. 2 is a diagram of example components of a device 200 that may correspond to one of the devices of environment 100 and/or customer premises 120. Device 200 may be included in, for example, content servers 130, content aggregator 140, entitlement key/server 150, user account server 160, authentication server 180, wireless router 122, laptop computer 124, portable device 126, set-top box 127, and/or computing device 170. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100 and/or customer premises 120.

As described herein, device 200 may perform certain operations in response to processing unit 220 executing software instructions contained in a computer-readable medium, such as memory 230. A computer-readable medium may be defined as a non-transitory memory device. A memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
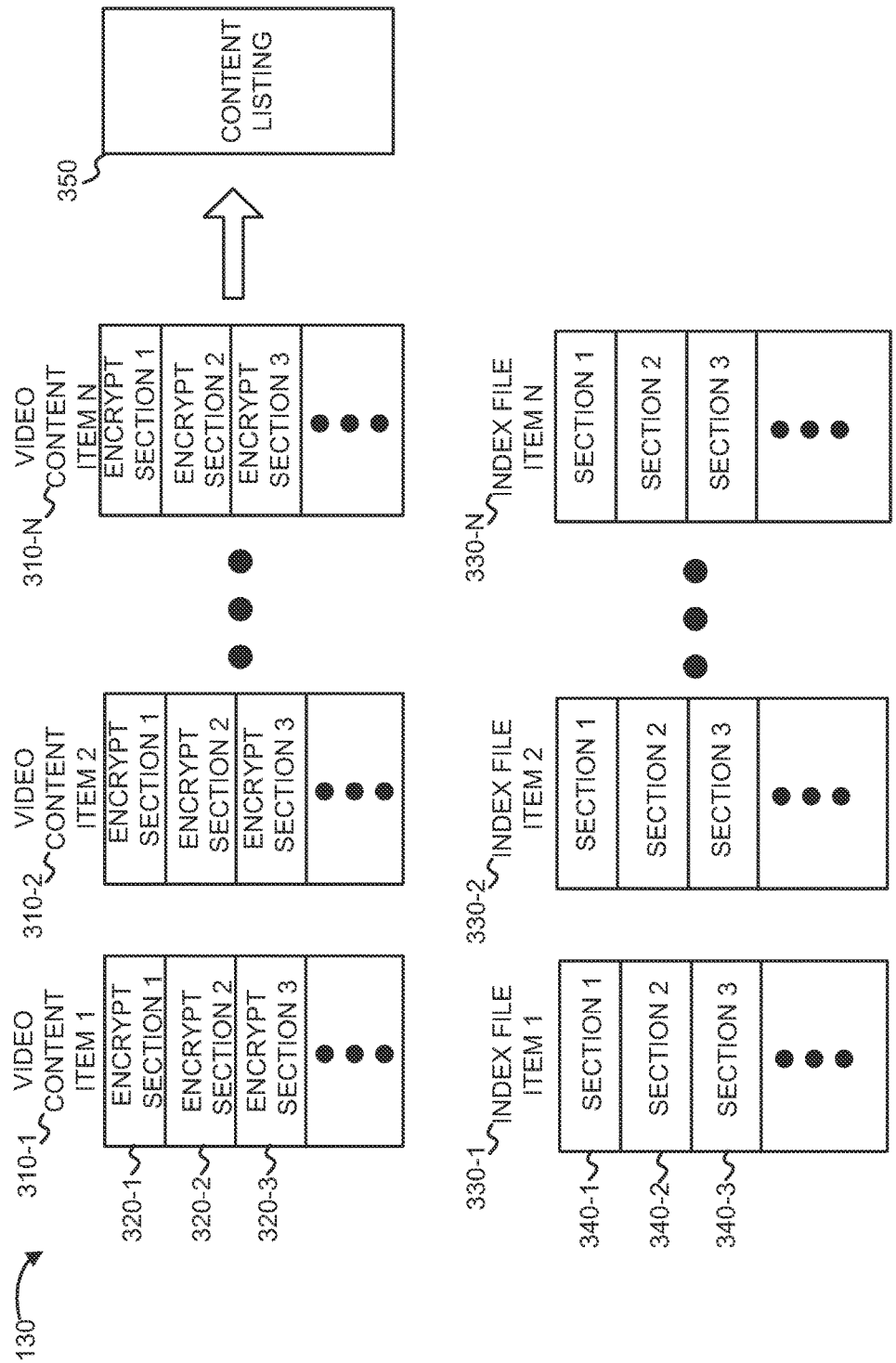
FIG. 3 is a diagram illustrating an example of data structures implemented by the content servers shown in FIG. 1.

FIG. 3 is a diagram illustrating an example of data structures implemented by content servers 130. As previously mentioned, content servers 130 may store content, such as television programming (live or delayed broadcasts), video on demand programming, or other types of content. The content may be received as streams of data from content aggregator 140. The streams may each be encrypted by content aggregator 140, such as by using 128 bit AES encryption (or another encryption algorithm).

As shown in FIG. 3, content received and stored by content servers 130 is illustrated as including video content items 310-1 (video content item 1) through video content item 310-N (video content item N). Each video content item 310 may correspond to, for example, a television program, a television broadcast stream, a video on demand movie, or another content item that may be delivered to a user. Each video content item 310 may be divided into sections, in which each section may be encrypted using a different encryption key. Video content item 310-1, for example, is shown as including three sections, section 320-1 (encrypt section 1), 320-2 (encrypt section 2), and 320-3 (encrypt section 3). The length of each section 320 may be, for example, based on a certain time duration (e.g., 30 minute sections), a target section size, or based on other factors.

Content servers 130 may also store an index file relating to each of the video content items 310. The index files are shown in FIG. 3 as including index files 330-1 through 330-N. Each index file 330 may include information corresponding to each of the encrypted sections 320 of video content items 310. Index file 330-1, for example, is illustrated as including sections, 340-1, 340-2, and 340-3, which may correspond to content sections 320-1, 320-2, and 320-3, respectively. Each section 340 may include, for example, information such as the beginning and end of the section, a link or other resource indicating the location of the decryption key file for the section, and/or descriptive information relating to the section. In one implementation, each of index sections 340-1 may include a uniform resource locator (URL) that points to a resource on entitlement/key server 150 at which the decryption key file for the corresponding content section 320 can be obtained.

By dividing a content item 310 into sections, the decryption key for the content item may be rotated. Each key rotation (i.e., each new section 320), may require the viewing device (e.g., computing device 170, etc.) to re-request the appropriate key file. Accordingly, a viewing device that becomes ineligible to receive the content may be denied access to the content.

Content listing 350 may include a listing of all of the potentially available content items. Content listing 350 may be used to generate, by a portable device of the user, a channel guide of the currently available or upcoming video streams. In one implementation, the video streams, from content listing 350, that are available to a particular user, may be filtered based on the entitlements of the user. Filtering an available content listing is described in more detail below.

Although FIG. 3 shows example components of content servers 130, in other implementations, content servers 130 may contain fewer components, different components, differently arranged components, or additional components than depicted in FIG. 3.

Figure 4:
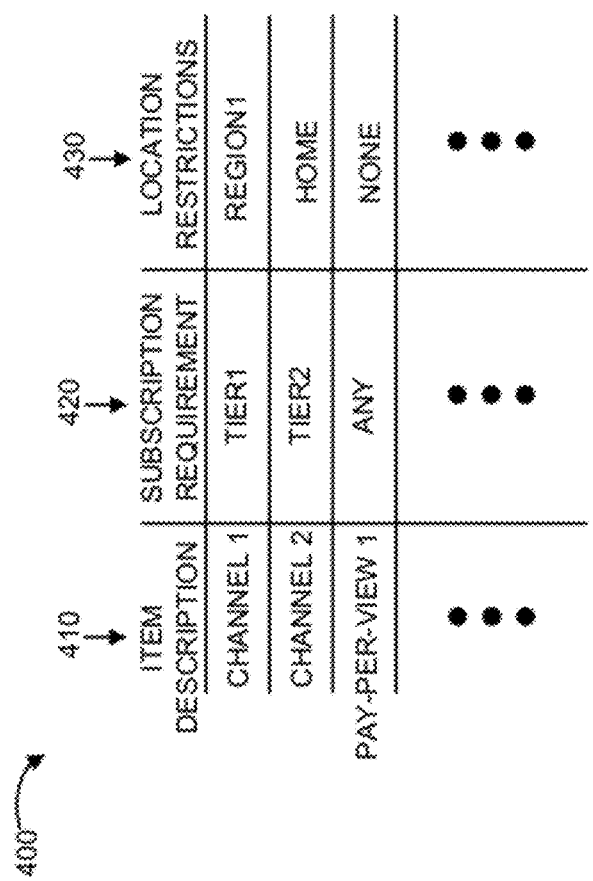
FIG. 4 is a diagram illustrating an example data structure that may store information relating to viewing restrictions for content items.

FIG. 4 is a diagram illustrating an example data structure 400 that may store information relating to viewing restrictions for content items 310. Data structure 400 may be stored at, for example, content aggregator 140 or entitlement/key server 150. Content owners may place restrictions on the devices that are allowed to playback a particular content item. Data structure 400 may be used to maintain the current restrictions placed on a content item.

Data structure 400 may include an item description field 410, an item subscription requirement field 420, and a location restrictions field 430. Each entry in data structure 400 may correspond to a content item 310. Item description field 410 may include a description of the content item. As shown, item description field 410 may include a label that indicates whether the content is a live television channel or another type of video stream (e.g., a pay-per-view movie). The first and second entries in data structure 400, for example, may correspond to television channels. The third entry in data structure 400 may correspond to a pay-per-view content item. In some implementations, item description field 410 may also include a link back to the content item 310 to which the content item corresponds.

Subscription requirement field 420 may include information describing the subscription plan or account options that need to be subscribed to, by a customer, before the customer can stream the corresponding content item to a portable device. In the example shown, the first entry in data structure 400 has a subscription requirement of "tier1," the second entry has a subscription requirement of "tier2," and the third entry has a subscription requirement of "any." These values may indicate that the content item corresponding to the first entry ("channel 1") can be received when the user is subscribed to the "tier 1" subscription package and the content item corresponding to the second entry ("channel 2") can be received when the user is subscribed to the "tier 2" subscription package. The content item corresponding to the third entry ("pay-per-view 1") can be received with any subscription package.

Location restrictions field 430 may include information describing geographic restrictions that are placed on the playing back of the corresponding content item. As previously mentioned, certain content items may only be played back to a portable device when the portable device is in a certain geographic location or region. The geographic location may include a geographic area that covers the subscriber's home (i.e., customer premises), a larger geographic region (such as a particular country, time zone, state, or other region), or another geographic area. In the examples shown in FIG. 4, the first entry in data structure 400 has a location restriction of "region1," the second entry has a location restriction of "home," and the third entry has a location restriction of "none." These values may indicate that the content item corresponding to the first entry ("channel 1")

can be received when the user is in the geographic area called "region 1" and the content item corresponding to the second entry ("channel 2") can be received when the user is at the user's home. The location of the user may not be relevant to whether the content item corresponding to the third entry ("pay-per-view 1") can be received.

Data structure 400 illustrates a number of example fields that may be associated with content items. In alternative implementations, additional or fewer fields may be used to determine entitlements to content items. For example, content items may be additionally associated with time based restrictions (e.g., a content item may only be viewed at certain times or after a certain date) and a field may be used in data structure 400 to maintain the time based restrictions.

As previously mentioned, techniques described herein may be used to playback video content delivered from content servers 130 to portable devices. The video content may be content designed to play on portable devices such as smart phones, tablet or "pad" computers, or laptops. In one implementation, to playback the video content, a user may first download and install a video playback application ("app") on the computing device. The playback application may then communicate with content servers 130, entitlement/key servers 150, and/or authentication server 180 to download and playback the desired video content. In one implementation, the video content may be delivered over content delivery network 110 using a packet streaming protocol, such as the known HTTP Live streaming protocol. In situations in which customer premises 120 connects to a telecommunications provider so that the subscriber can receive both traditional television signals, via a dedicated connection, and IP based data services, such as an Internet connection, the video content delivered to the playback application may be delivered via the IP-based packet network (also referred to as over-the-top (OTT) delivery herein).

Figure 5:
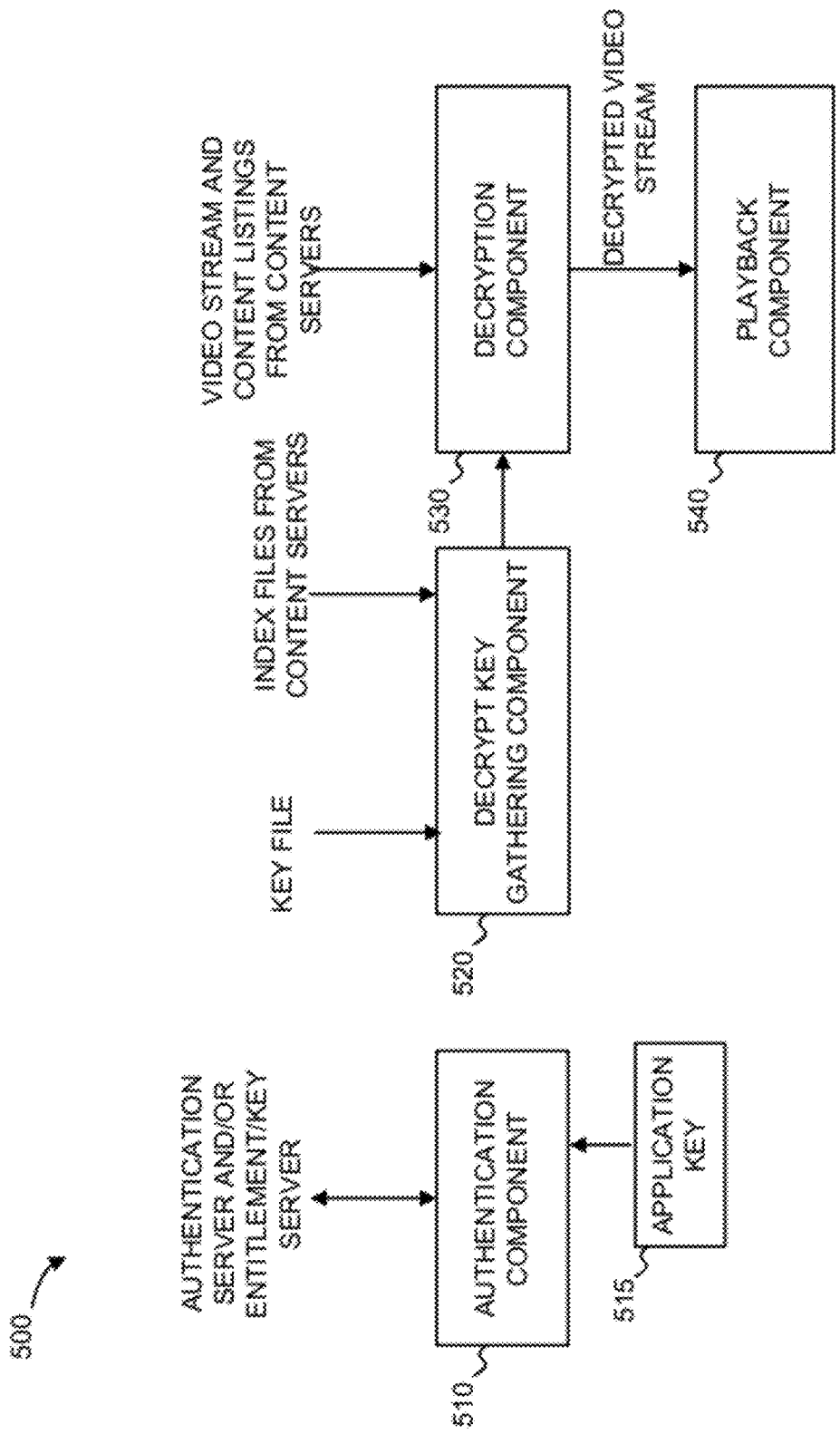
FIG. 5 is a diagram illustrating an example of functional components of a playback application.

FIG. 5 is a diagram illustrating an example of functional components of a playback application 500, such as an application run on a portable computing/communication device (e.g., laptop computer 124, portable device 126, computing devices 170). Playback application 500 may be particularly designed to display content that is entitled to be played back by the user, receive a user's selection of content items, and playback the selected content item. In this manner, a user can enjoy video content items, which may be derived from traditional television programming.

As shown in FIG. 5, playback application 500 may include an authentication component 510, an application key 515, a decrypt key gathering component 520, a decryption component 530, and a playback component 540.

Authentication component 510 may communicate with authentication server 180 and/or entitlement/key server 150 to authenticate the user of playback application 500 and to obtain permission to view a selected program. Decrypt key gathering component 520 may generally receive the index file 330 corresponding to a selected content item and may obtain one or more decryption key files for the content item. Index file 330 may be obtained from content servers 130 and the decryption keys may be obtained from entitlement/key server 150. Decrypt component 530 may receive, for example, an encrypted version of the video stream from content servers 130 and/or a filtered version of content listings 350. Using the obtained decryption key, decryption component 530 may decrypt an incoming video stream corresponding to the selected program. Playback component 540 may playback the decrypted video stream to the user, such as on an LCD display of the portable computing/communication device. The operation of the components of playback application 500, and its interaction with other elements of environment 100, will be described in more detail below with reference to FIGS. 6-8.

Application key 515 may be included as part of playback application 500. Application key 515 may be a value that is used by playback application 500 when authenticating playback application 500. In some implementations, different versions of playback application 500 may be released for different portable device platforms. In this case, application key 515 may be different for each portable device platform.

Although FIG. 5 shows example components of playback application 500, in other implementations, playback application 500 may contain fewer components, different components, differently arranged components, or additional components than depicted in FIG. 5. Alternatively, or additionally, one or more components of playback application 500 may perform one or more other tasks described as being performed by one or more other components of playback application 500.

Figure 6:
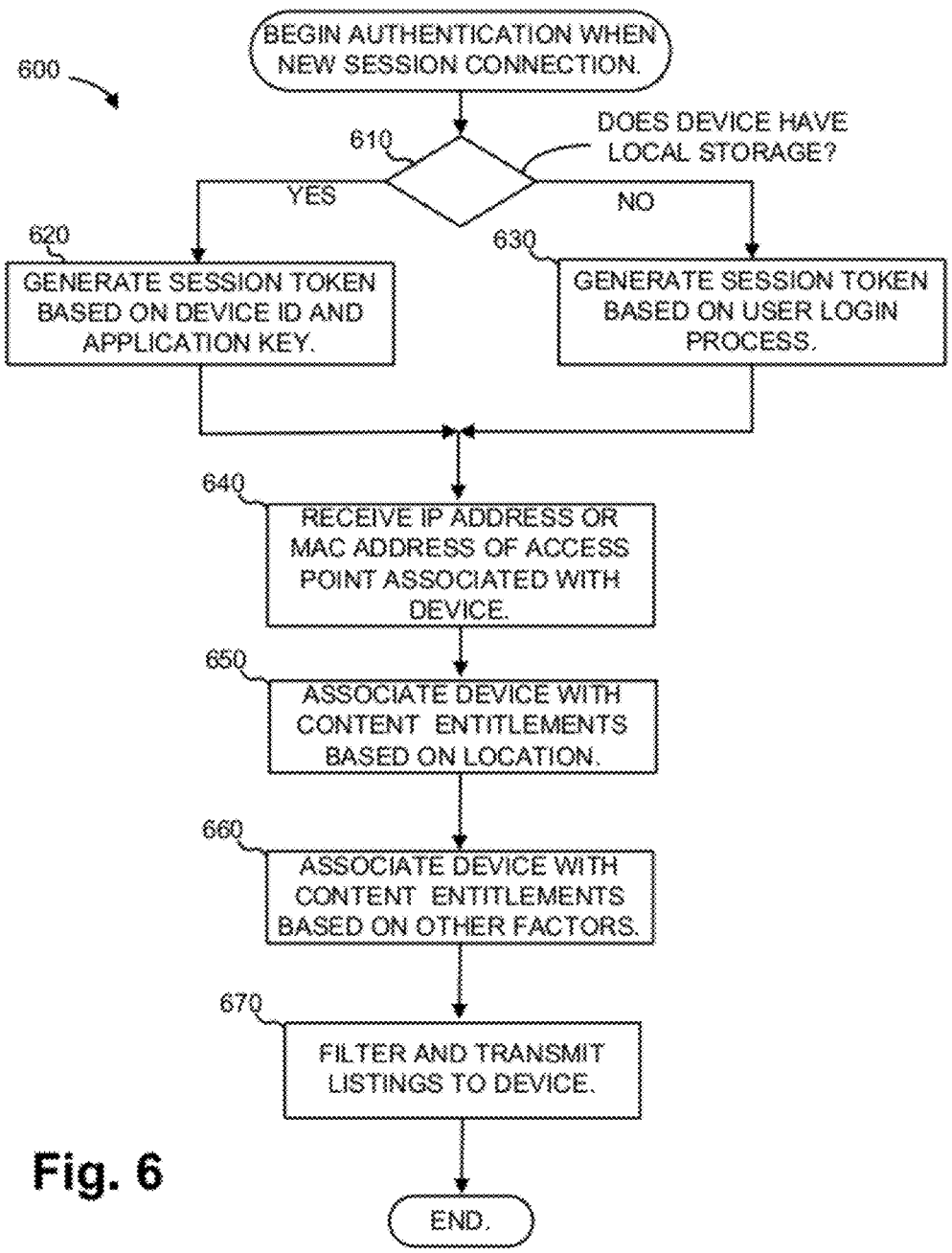
FIG. 6 is a flow chart illustrating an example process for authenticating a playback application to play back requested video content.

FIG. 6 is a flow chart illustrating an example process 600 for authenticating playback application 500, executing at a portable device, to playback requested video content. Process 600 may be performed by playback application 500 whenever playback application 500 is initiated or whenever a new session is established by the portable device. A new session may be established by the portable device whenever the portable device connects to a new access point (e.g., wireless router 122) or other network connection. For example, if the user moves from his home to a retail outlet, the user's session with wireless router 122 may be lost when the user moves out of range of wireless router 122 and a new session with a wireless router at the retail outlet may be established when the user moves into range of the wireless router at the retail outlet. Authentication may be performed when the user's portable device begins a new network session with wireless router 122 and again when the user connects to the wireless router at the retail outlet.

Authentication may be performed differently depending on whether the portable device includes local storage. Process 600 may thus include determining whether the portable device includes local (i.e., non-volatile) storage (block 610).

When the portable device includes local storage (block 610—YES), process 600 may include generating a session token based on a device identification value (ID) and based on application key 515 (block 620). The device ID may be a value that is unique to the portable device hardware, such as a value stored in a read-only memory or other non-volatile memory of the portable device. An encrypted version of the session token may be transmitted to entitlement/key server 150 or another server, such as authentication server 180. In one implementation, the encrypted version of the token may be transmitted over an HTTPS session in which a third party server, such as authentication server 180, is used as part of the authentication.

When the portable device does not include local storage (block 610—NO), process 600 may include generating a session token based on a user login process (block 630). For example, the user may be required to enter an account ID and/or password. The account ID and/or password may be used to authenticate playback application 500 to entitlement/key server 185, which may then transfer the session key to the portable device.

Alternatively, instead of determining whether the portable device includes local storage, different versions of playback application 500 may be distributed for different portable devices/platforms. In this situation, whether playback application 500 generates a session token based on the operations of blocks 620 or 630 may be hardcoded into playback application 500.

Process 600 may further include receiving the IP address or MAC address associated with the access point that is being used by the portable device during the current session (block 640). This information may be received from the portable device as part of the initial authentication performed by playback application 500. The IP/MAC address may be used to determine whether the portable device satisfies location-based content restriction, such as location restrictions imposed by the content owner or creator.

Process 600 may further include associating the portable device with content entitlements based on the location of portable device (block 650). Entitlement/key server 150 may, for example, compare the received IP or MAC address to the corresponding IP or MAC address that is currently associated with the user's account. Entitlement/key server 150 may look up the expected IP or MAC address via a request to user account server 160. The IP address of the access point in customer premises 120 may, for example, be assigned to the access point by the company that provides playback application 500. Accordingly, this IP address may be known and associated with the customer's account. Similarly, the MAC address of the access point in customer premises 120 may be known and associated with the customer's account.

When the IP or MAC address of the portable device's access point matches the IP or MAC address associated with customer premises 120, the portable device may be assumed to be in the customer's home. Accordingly, content items that are associated with entitlement restrictions that require that the user be at home may be enabled (e.g., the content item "channel 2" in data structure 400). Because the location of the user's home is known, a user that is determined to be at home may also be enabled to receive content items that include other geographic restrictions, such as the user being located in a particular region. In FIG. 4, the content item "channel 1" includes a location restriction "region 1." If the portable device is determined to be in the user's home and the user's home is at a geographic location that is within "region 1", the user may also be determined to be entitled to, based on the geographic restrictions, view this content item.

In some implementations, geographic content entitlements may be determined using techniques other than determining whether the user is at home. For example, an IP address may, in general, be associated with geographic locations. For example, a certain IP address, even if it is determined to not correspond to a subscriber's premises, may be determined to be an IP address that is allocated to users of a particular city or other geographical region. Corresponding region-based geographic entitlements may thus be enabled. Assume, for example, that the IP address received in block 640 indicates that the portable device is not at customer premises 120, but that the portable device is within geographic region "region1" (FIG. 4). In this example, the portable device may be given, with respect to the content items shown in FIG. 4, location-based entitlement to the content items "channel 1" and "pay-per-view 1", but not "channel 2".

Still other techniques may alternatively be used to determine the geographic location of the user. For instance, some portable devices may include global positioning system (GPS) functionality through which the portable device can determine its location. Still further, other techniques for determining device location, such as triangulation using wireless base stations, may be used.

Process 600 may further include associating the portable device with content entitlements based on other factors (block 660). For example, as previously mentioned, certain content items may only be available to customers that subscribe to certain packages or channels. Entitlement/key server 150 may, for example, look up, via a request to user account server 160, the channels or packages to which a customer is subscribed. Only content items that include subscription requirements that are covered by customer's subscriptions may be entitled to be downloaded.

In some situations, an indication of the entitlements, as determined in blocks 650 and 660, may be stored by a server in environment 100, such as entitlement/key server 150. In other implementations, an indication of the user entitlements may be embedded in the session token.

The entitlements determined in blocks 650 and 660 may be used to filter the available program listings (e.g., the program guide) that are available to the user (block 670). For instance, the complete set of content listings, listings 350, may be filtered to remove content listings not covered by determined user entitlements (i.e., location-based or based on other factors). The filtered content listings may be transmitted to the portable device (block 670). The portable device may display the filtered content listings to the user, who may choose which of the displayed listings to playback by playback application 500.

Figure 7:
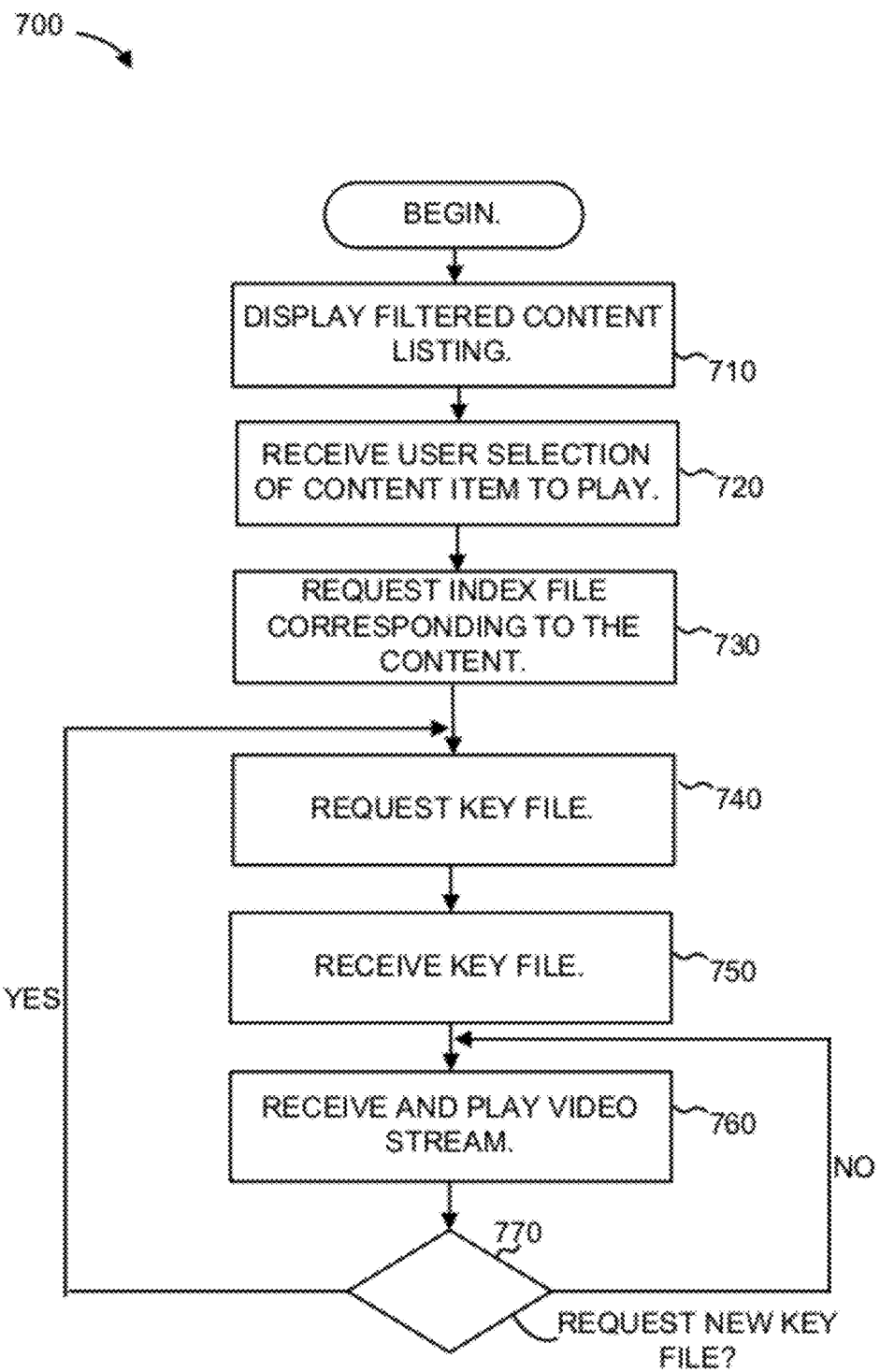
FIG. 7 is a flow chart illustrating an example process for receiving streaming content at a portable device.

FIG. 7 is a flow chart illustrating an example process 700 for receiving streaming content at a portable communication device. Process 700 may be performed, for example, by playback application 500, executing on a portable communication device.

Process 700 may include displaying the filtered content listings by the portable device (block 710). The filtered content listings may be displayed as a program or content guide through which the user can choose a content item for playback. As previously mentioned, the filtered content list may be received as part of the authentication process of the portable device (FIG. 6, block 670). Alternatively, the filtered content listing may be received by playback application 500 at other times, such as periodically as the new content items become available for viewing.

At some point, the user of playback application 500 may select a particular content item to begin playback of the content item. Playback application 500 may receive the user's selection of the content item (block 720). Playback application 500 may, for example, present a graphical menu to the user, through which the user can select a video stream to play, such as a particular available television channel, show, or other content item.

Process 700 may further include, in response to the user selecting content to play, requesting the index file corresponding to the content (block 730). Decrypt key gathering component 520 of playback application 500 may, for example, request the index file 330 corresponding to the content from content servers 130. The index file 330 may include a link or other reference describing the resource to use to retrieve the decryption key for the content.

Process 700 may further include requesting the key file (block 740). For example, decrypt key gathering component 520 may use a link in index file 330 to request the key file, via an HTTPS request, from entitlement/key server 150. Decrypt key gathering component 520 may transmit, to entitlement/key server 150, the encrypted session token that was previously received during authentication of the portable communication device (e.g., as performed in process 500).

Process 700 may further include receiving the key file in response to the request made in block 740 (block 750). The key file may be received, for example, by decrypt key gathering component 520. The key file may include the decryption key needed to decrypt the requested content. In some implementations, the key file may include other information, such as an indication of when the decryption key expires (i.e., when a new key file should be requested).

Process 700 may further include receiving and playing the video stream from content servers 130 (block 760). Decryption component 530 of playback application 500 may receive the encrypted video stream from content servers 130. Decryption component 530 may use the key received in block 730 to decrypt the video stream. The video stream may then be played back to the user.

As mentioned previously, the key for a video stream may be changed at various times. Process 700 may further include determining if a new key file should be requested (block 770). The new key file may be requested periodically, based on a certain amount of received video content, or based on other factors. For example, each key file may include an indication of when the key in the key files expires. When it is time to request a new key file (block 770—YES), process 700 may return to block 740. Otherwise, the current key may continue to be used to playback the video stream (block 770—NO).

Figure 8:
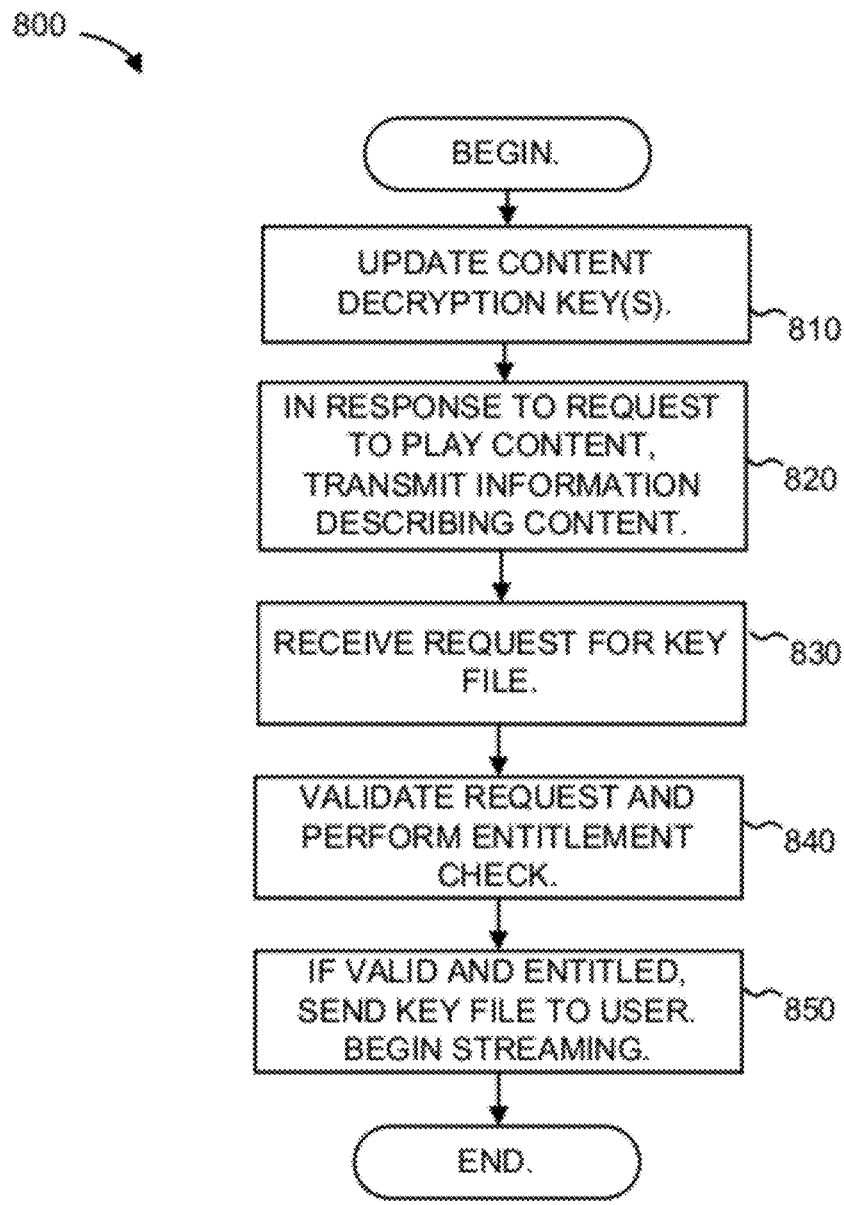
FIG. 8 is a flow chart illustrating an example process for streaming content to a playback application.

FIG. 8 is a flow chart illustrating an example process 800 for streaming content to playback application 500. Process 800 may be performed by, for example, one or more of content servers 130, content aggregator 140, entitlement/key server 150, and authentication server 180.

Process 800 may include updating the content decryption keys (block 810). As previously mentioned, content aggregator 140 may encrypt received content streams and provide the encrypted streams to content servers 130. The keys used to encrypt the content streams may periodically (e.g., every 30 minutes) be changed. The encryption keys may be published to entitlement/key server 150 and content servers 130 may store index files 330 that provide links to key files that include the encryption keys.

As mentioned previously, a user of a portable device may, through playback application 500, request the playing of content, such as a request that a particular television channel be streamed to the portable communication device. In response to the request, content servers 130 may transmit information describing the content (block 820), such as one of index files 330. Index file 330 may include a link to the decryption key file corresponding to the desired content.

Playback application 500 may receive an index file 330, and based on the index file, may request the appropriate key file from entitlement/key server 150. For example, decrypt key gathering component 520 may request the key file, over the HTTPS session, based on the link in index file 330. The request may embed an encrypted session token (or other identifier) that may indicate that the request is part of a valid session (as was previously established using the process described in FIG. 6).

Referring back to FIG. 8, entitlement/key server 150 may receive the request for the key file (block 830), and, in response, may validate and perform an entitlement check for the request (block 840). Validating the request may include validating the encrypted session token received with the request. The entitlement check may include a just-in-time (JIT) check to ensure that the requesting portable device is entitled to receive the content item. The entitlement check may include comparing the location restrictions 430, subscription requirement restrictions 420, and/or other restrictions, which apply to the requested content item, to the location (e.g., "at home" or "not at home") or user account information corresponding to the portable device. In one implementation, the location and/or user account information that is relevant to the entitlement determination may be included within the encrypted session token.

In some implementations, other checks may be made in addition to the content entitlement check. For example, a parental control feature may be enabled for the account, which may allow users to associate passwords with selected channels. In this case, the user entered password may be submitted as part of the key file request and checked as part of block 840.

When the request for the key file is valid and the portable device is entitled to the content item, entitlement/key server 150 may transmit the key file, which contains the needed decryption key (block 850). Additionally, content server 130 may begin streaming the appropriate section 320 of the requested content item 310 (block 850).

Figure 9:
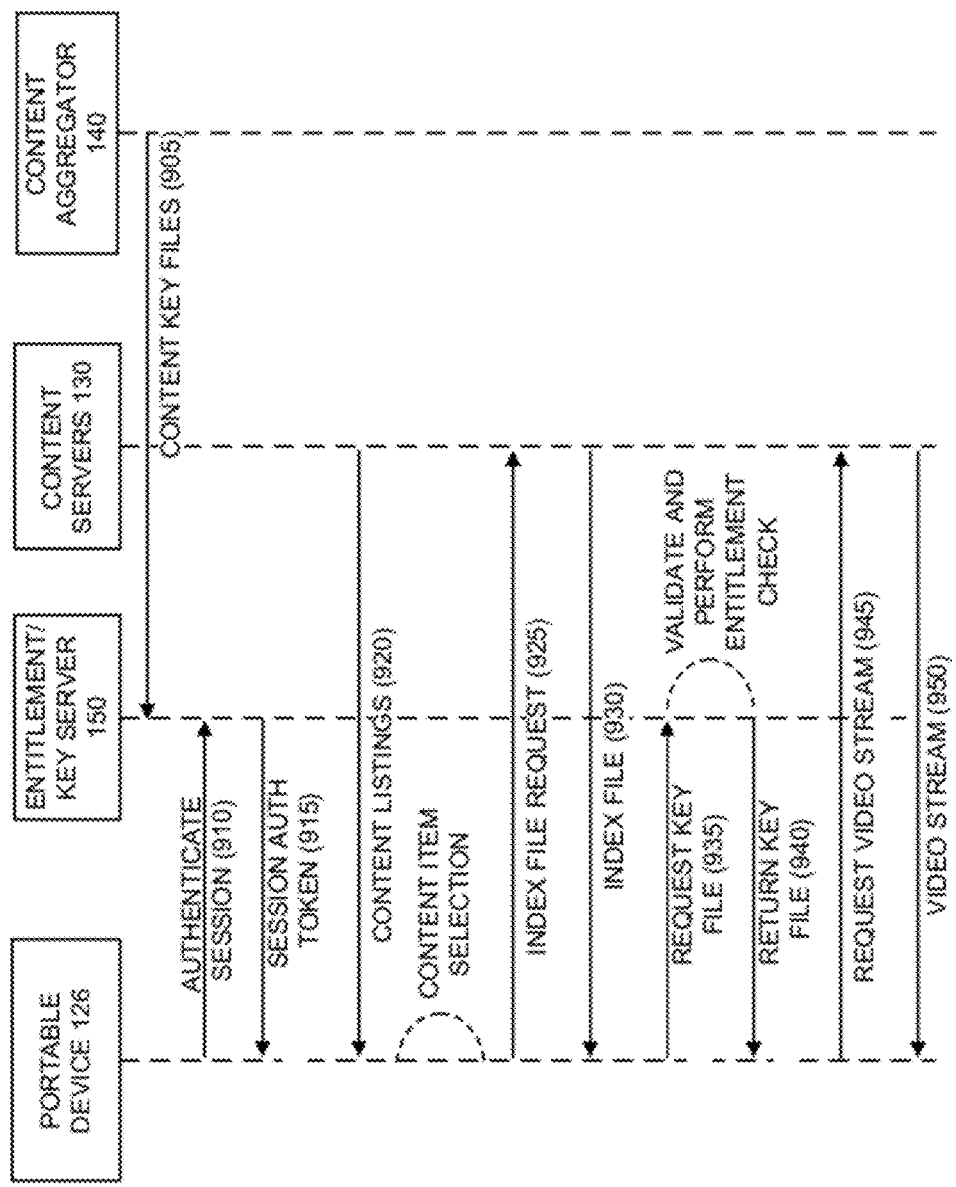
FIG. 9 is signal flow diagram illustrating an example of communications between components in the system shown in FIG. 1 during streaming of video content.

FIG. 9 is signal flow diagram illustrating an example of communications between components in system 100 during streaming of video content. In FIG. 9, assume that a live television channel is streamed to playback application 500, which is executing on a portable device.

Content aggregator 140, as it aggregates and encrypts incoming content, may upload decryption key files to entitlement/key server 150 (communication 905). A new key file may be uploaded, for example, every 30 minutes for a television channel.

At some point, such as whenever playback application 500 is initially started, and whenever portable device 126 changes network connections, playback application 500 may contact entitlement/key server 150 (or, alternatively, authentication server 180) to authenticate the current session (communication 910). As mentioned above, the session authentication may include determining the geographic location of portable device 126. Based on the location of the portable device, such as determined based on the IP address of the access point through which the user connects, it may be determined whether the portable device 126 is connecting in "in-home" mode in "not in-home mode" (e.g., OTT mode). An encrypted session authorization token may be passed back to playback application 500 (communication 915). The session authorization token may only be valid for the current communication session with authentication server 180. In some implementations, the session authorization token may indicate the user's location or include other information.

The current content listings (e.g., television guide data) may be transferred from content servers 130 to portable device 126 (communication 920). Updates for the current content listings may also be periodically transferred to portable device 126, either automatically or in response to requests from portable device 126.

Playback application 500 may display the content listings to the user, allowing the user to select a content item (e.g., a television show or channel) for viewing. At some point, the user may select a particular content item. In response, playback application 500 may request an index file, relating to the particular content items, from content servers 130 (communication 925). Content servers 130 may return the index file to playback application 500 (communication 930).

The index file may contain a link to the key file for the content item. Playback application 500 may thus use the index file to request the key file from entitlement/key server 150 (communication 935). Entitlement/key server 150 may validate the user's session, such as by validating an encrypted session token that is passed to entitlement/key server 150 as part of the key file request. Entitlement/key server 150 may also perform an entitlement check relating to the requested content item. As previously discussed, the entitlement check may be based on whether restrictions associated with the content (e.g., geographic restrictions, subscription restrictions, etc.) are met. If the validation and entitlement checks are successful, the key file may then be returned to playback application 500 (communication 940).

Playback application 950 may request the desired video content from content servers 130 (communication 945). The video content may then be streamed to playback application 500 over content delivery network 110 (communication 950). The streamed video content may be, for example, streamed "over the top" through an IP packet-based network.

As described above, video content may be streamed to a portable communication device. A user's entitlement to view the video content may be made based on a number of possible factors, such as the physical location of the portable device. Content listings supplied to the user may be filtered based on the entitlements. Advantageously, content owners/providers may have a relatively high level of flexibility in offering content.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components and/or logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:

receiving, by the one or more computing devices, a request to authenticate a portable device associated with a user account to receive streaming video content selected from a plurality of video content items, wherein multiple location-based content restrictions, assigned by a content provider or telecommunications provider associated with the streaming video content, are associated with the user account, the location-based content restrictions including a location-based content restriction corresponding to a customer premises associated with the user account and a location-based content restriction corresponding to a geographical area larger than and inclusive of the customer premises;

determining, by the one or more computing devices, an indication of a physical location of the portable device;

determining, by the one or more computing devices and based on the multiple location-based content restrictions, which of the plurality of video content items are permitted to be accessed by the portable device at the physical location of the portable device, the plurality of the determined content items including:

a first set of content items that are permitted to be accessed by the portable device within the customer premises but not outside of the customer premises, and a second set of content items that are permitted to be accessed by the portable device in the geographical area larger than and inclusive of the customer premises;

transmitting, by the one or more computing devices, to the portable device, a listing of the plurality of video content items, filtered based on the determining of the plurality of video content items that are permitted to be accessed by the portable device;

receiving, by the one or more computing devices, an indication of a selection of a particular video content item from the listing of the plurality of video content items;

streaming, by the one or more computing devices, an encrypted version of the particular video content item to the portable device, wherein the encrypted version of the particular video content item is encrypted using a different encryption key for each of a plurality of sections of the encrypted version of the particular video content item;

receiving a plurality of requests, from the portable device, for decryption keys, corresponding to respective sections of the encrypted version of the particular video content item; and applying the multiple location-based content restrictions to each of the plurality of requests.

2. The method of claim 1, wherein the indication of the physical location of the portable device includes an indication of whether the portable device is in a geographic location corresponding to global positioning system (GPS) information associated with the customer premises account.

3. The method of claim 1, wherein the indication of the physical location of the portable device is determined based on an Internet Protocol (IP) address or media access control (MAC) address of an access point to which the portable device is determined to be connected.

4. The method of claim 1, further comprising:

generating a session token to use during authentication of the portable device, the session token being based on:
when the portable device includes local non-volatile storage, an identifier associated with the portable device and an application key associated with a playback application executed by the portable device; or when the portable device does not include the local non-volatile storage, information obtained during a user login process.

5. The method of claim 1, further comprising
filtering the listing based on subscriptions associated with the account.

6. The method of claim 1, further comprising:
storing a key file that includes the decryption keys needed to decrypt the respective sections of the encrypted version of the particular video content item.

7. The method of claim 6, further comprising:
transmitting, in response to the plurality of requests and in response to the application of the multiple location-based content restrictions, the decryption keys needed to decrypt the respective sections of the encrypted version of the particular video content item.

8. The method of claim 1, where the portable device includes a tablet computer, a smart phone, or a laptop computer.

9. The method of claim 1, where the plurality of video content items includes streaming video corresponding to a television channel.

10. A non-transitory computer-readable medium containing programming instructions for execution by one or more processors, the computer-readable medium comprising:
instructions to receive a request to authenticate a portable device associated with a user account to receive streaming video content selected from a plurality of video content items, wherein the user account relates to multiple location-based content restrictions, assigned by a content provider or telecommunications provider associated with the streaming video content, including a location-based content restriction corresponding to a customer premises associated with the user account and a location-based content restriction corresponding to a geographical area larger than and inclusive of the customer premises;
instructions to determine, by the content provider or telecommunications provider, an indication of a current location of the portable device;
instructions to apply the location-based content restrictions to determine which of the plurality of video content items are available to the portable device at the current location of the portable device, the determination of the plurality of the video content items that are available including determination of:
a first set of video content items that are permitted to be accessed by the portable device within the customer premises but not outside of the customer premises, and
a second set of video content items that are permitted to be accessed by the portable device in a geographical area larger than and inclusive of the customer premises;
instructions to transmit, to the portable device, a listing of the plurality of video content items that are available to the portable device at the current location;
instructions to receive an indication of a selection of a particular video content item from the listing of the plurality of video content items;
instructions to stream an encrypted version of the particular video content item to the portable device, wherein the encrypted version of the particular video content item is encrypted using a different encryption key for each of a plurality of sections of the encrypted version of the particular video content item;
instructions to receive a plurality of requests, from the portable device, for decryption keys, corresponding to respective sections of the encrypted version of the particular video content item; and
instructions to apply the multiple location-based content restrictions to each of the plurality of requests.

11. The non-transitory computer-readable medium of claim 10, wherein the plurality of video content items includes television channels.

12. The non-transitory computer-readable medium of claim 10, wherein the indication of the current location of the portable device includes an indication of whether the portable device is in a geographic location corresponding to the customer premises.

13. The non-transitory computer-readable medium of claim 10, wherein the indication of the current location of the portable device is determined based on an Internet Protocol (IP) address or media access control (MAC) address of an access point to which the portable device is currently connected.

14. The non-transitory computer-readable medium of claim 10, further comprising:
instructions to, when the portable device includes local non-volatile storage, generate a session token to use during the authentication of the portable device based on an identifier associated with the portable device and an application key associated with a playback application executed by the portable device; and
instructions to, when the portable device does not include the local non-volatile storage, generate the session token to use during the authentication of the portable device based on information obtained during a user login process.

15. The non-transitory computer-readable medium of claim 10, further comprising instructions to:
determine which of the plurality of video content items are available to the portable device based additionally on subscriptions subscribed to by the account associated with the portable device.

16. A system, comprising:
a content server to store encrypted video content that is to be transmitted to a portable device associated with a subscriber to television content corresponding to a subscriber account;
an entitlement server to:
store keys needed to decrypt the encrypted video content,
determine entitlements, relating to television channels which the portable device is eligible to receive, based at least on an indication of a location of the portable device, the entitlements being assigned by a content provider or telecommunications provider associated with the television channels, and the entitlements including a first entitlement corresponding to a customer premises associated with the subscriber account and a second entitlement corresponding to a geographical area larger than and encompassing the customer premises,
transmit, to the portable device, a listing of available television content, filtered based on the determined entitlements, the listing including:
a first set of content items corresponding to content items that are permitted to be accessed by the portable device within the customer premises but not outside of the customer premises, and a second set of content items corresponding to content items that are permitted to be accessed by the portable device when the portable device is outside of the customer premises and within the geographical area, receive a plurality of requests, from the portable device, for decryption keys, corresponding to respective sections of an encrypted version of a particular video content item from the first set of content items or the second set of content items, and selectively transmit the decryption keys, to the portable device, based on application of the first and second entitlements; and a content aggregator to receive broadcast television content and to provide the broadcast television content, as the encrypted video content stream, to the content server.

17. The system of claim 16, wherein the entitlement server determines the entitlements relating to the television channels based on whether the indication of the location of the portable device is within a geographic location corresponding to the customer premises during transmission of the encrypted video content to the portable device.

18. The system of claim 16, wherein the entitlement server determines the entitlements relating to the television channels based on whether the indication of the location of the portable device is within a geographic location corresponding to the region during transmission of the encrypted video content to the portable device.

19. The system of claim 16, wherein the entitlement server determines the entitlements relating to the television channels based on whether the account associated with the portable device is subscribed to the television content.

20. The system of claim 16, where the indication of the location of the portable device is determined based on an Internet Protocol (IP) address or media access control (MAC) address of the access point to which the portable device is connected for receiving the encrypted video content.

21. The system of claim 16, where a key used to encrypt the encrypted video content is periodically altered.

22. The system of claim 16, wherein the portable device includes a tablet computer, a smart phone, or a laptop computer.

* * * * *